US012560551B2

(12) United States Patent
Szuba et al.

(10) Patent No.: US 12,560,551 B2
(45) Date of Patent: Feb. 24, 2026

(54) SENSOR HOUSING FOR A SENSOR MODULE

(71) Applicant: Aptiv Technologies AG, Schaffhausen (CH)

(72) Inventors: Pawel Szuba, Cracow (PL); Jakub Malina, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 99 days.

(21) Appl. No.: 18/666,892

(22) Filed: May 17, 2024

(65) Prior Publication Data

US 2024/0393257 A1     Nov. 28, 2024

(30) Foreign Application Priority Data

May 23, 2023     (EP) ..................................... 23174931

(51) Int. Cl.
*G01N 21/88* (2006.01)
*H05B 3/84* (2006.01)

(52) U.S. Cl.
CPC ........... *G01N 21/8851* (2013.01); *H05B 3/84* (2013.01); *G01N 2201/0231* (2013.01)

(58) Field of Classification Search
CPC ....... G01N 21/8851; G01N 2201/0231; H05B 3/84; G01J 5/061; H04N 23/52; H04N 23/51; H04N 23/54; G03B 17/55
See application file for complete search history.

(56) References Cited

U.S. PATENT DOCUMENTS

| | | | | |
|---|---|---|---|---|
| 5,864,365 A | * | 1/1999 | Sramek | ............ G08B 13/19619 |
| | | | | 348/E5.026 |
| 10,156,351 B2 | | 12/2018 | Takahashi | |
| 10,597,002 B1 | | 3/2020 | Baldovino | |
| 11,397,306 B2 | | 7/2022 | Liu | |
| 2020/0035385 A1 | | 1/2020 | Brexeler | |
| 2021/0011283 A1 | | 1/2021 | Dubey | |
| 2021/0096270 A1 | * | 4/2021 | Brands | ................... G01T 1/023 |
| 2021/0333197 A1 | | 10/2021 | Christ | |
| 2021/0400179 A1 | | 12/2021 | Brown | |

FOREIGN PATENT DOCUMENTS

| | | | |
|---|---|---|---|
| DE | 102011122771 A1 | 4/2013 | |
| EP | 3675616 A1 | 7/2020 | |

OTHER PUBLICATIONS

Extended European Search Report for EP23174931.8, dated Oct. 16, 2023, 7 pages.

* cited by examiner

*Primary Examiner* — Seung C Sohn
(74) *Attorney, Agent, or Firm* — Miller Johnson

(57)     ABSTRACT

A sensor housing for a sensor module. The sensor housing includes an insulated internal volume and a thermal electric device. The insulated internal volume is configured for accommodating the sensor module therein. The thermal electric device is configured for alternatively heating and cooling the internal volume and/or the sensor module.

14 Claims, 2 Drawing Sheets

SENSOR HOUSING FOR A SENSOR MODULE

CROSS-REFERENCE TO RELATED APPLICATIONS

This application claims priority to EP 23 174 931 filed May 23, 2023, the entire disclosure of which is incorporated by reference.

FIELD

The present disclosure relates to a sensor housing for a sensor module, e.g. a camera, particularly for use in a system and method for testing in an environment such as a climatic chamber where the sensor module may be subjected to extreme temperature conditions.

BACKGROUND

Sensors may be subjected to a wide range of temperatures in use. For example, external sensors on a vehicle may need to operate in extreme climates, depending on time of year and geographical location.

Furthermore, sensors implemented in testing applications may be artificially subject to a wide range of temperatures. For example, electronic components such as vehicle display units are often tested to monitor the limits of operation in harsh environments. Testing may be undertaken in a climatic chamber operating at extremes of temperature, with the assistance of a digital camera in combination with software that looks for patterns in a captured image, to report on performance. However, the range of environmental conditions, such as temperature, can cause problems with the quality of captured images. This problem can cause image comparison and evaluation to be inaccurate or even impossible to perform because of high image degradation. Accordingly, the automatic detection of defects in products can be unreliable.

The above identified problems appear independently of the type of camera used. Even dedicated solutions for different environment cameras have this drawback since they may work adequately at specified temperatures (extreme high or extreme low) but cannot maintain a unified image quality in a full operating range which may be needed for testing, i.e. both high and low. Differences in color, saturation and thermal noise are just some of the observed distortions in a final image, dependent on the temperature. In other words, available cameras for testing, and/or protective housings, are not suited to maintain a camera at a stable operating temperature in both extreme hot and extreme cold environments.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present disclosure seeks to address issues with conventional solutions or at least provide an alternative to the public and manufacturers/testers of electronic devices.

According to a first aspect, a sensor housing, e.g. for use in a test environment, is provided according to claim 1. The sensor, e.g. a camera, housing comprises, for example: an enclosure formed of insulated walls configured for accommodating a sensor module; a thermal electric device configured for alternatively heating and cooling the enclosure and/or sensor module; and, in practice, a controller for controlling the thermal electric device.

In this way, the housing disclosed herein may also be suited to wide range of applications in industry, aerospace, consumer products, automotive, i.e. in safety systems (e.g. safety cameras). The invention may provide stable output for critical decision-making systems etc. The sensor module may be, for example, a camera module or a radar module.

In embodiments, the thermal electric device is a Peltier module. In this way, the solution is based on the Peltier effect wherein a first side of the Peltier module is thermally coupled with the camera module and the second side may be coupled with an external radiator. This arrangement provides the possibility to alternatively cool or heat the housing and enclosed camera according to need by changing the direction of the current flow through the Peltier module. As a result, maintaining a constant temperature of the camera is possible. The benefits of using a Peltier module include: heating and cooling in one module; ease of control; possible power modulation; compact build; clean operation with no emissions.

In embodiments, the housing comprises an internal and/or external radiator in thermal communication with the camera module and thermal electric device, respectively.

Accordingly, a temperature adaptive camera box (i.e. the housing) as described herein solves the problem of image quality unification in various environmental conditions by maintaining a constant temperature of the camera. As a consequence, the imager also works in a stable operation point, i.e. the image/video captured by the camera module maintains its parameters through a full range of temperatures during testing inside a climatic chamber. This enables the possibility to perform visual inspection and use images captured by the camera module to reliably evaluate parameters of displays and other previously mentioned products/components.

In embodiments, the thermal electric device can be broadly described as a heating or cooling device to either heats or cools the camera and related components as needed. Active internal cooling of the camera by way of a thermal electric heater (TEH) or thermal electric cooler (TEC) compensates for temperature-induced variations due to the different ambient temperatures outside the enclosure, so that stability of the PCB and imager relative to the lens is maintained. A thermal electric device configured for heating, when the ambient temperature is low, can also be run in reverse to cool the camera electronics during hot conditions to maintain stability of the PCB and imager relative to the lens.

In this way, the thermal electric device may be operable to heat or cool selected components of the camera or the camera as a whole to take into account temperature changes. Optionally, an electric lens heating element may be implemented proximate the lens, to counter any fogging that may occur at a window into the housing.

In a second broad aspect, the invention envisages a system according claim 7.

By way of overview, the invention comprises a thermal isolated enclosure and an active temperature control system, maintaining a stable operating point for the whole sensor (in the case of a camera, both optics and electronics). This capability may recommend it for other like automotive applications, where imaging sensors are used, i.e. an image from a safety camera will be able to give results independent of external temperature conditions.

By implementing advanced manufacturing and production processes, miniature sensors can be enclosed in an integrated and dedicated "temperature adaptive enclosure" according to the invention. This can be small sized enclosure with control electronics placed outside it.

A third aspect of the invention is embodied by a testing method according to claim 8, e.g. for operating a camera which is adaptable to wide temperature variations in a climatic chamber testing environment.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

The following description presents various embodiments and, together with the drawings, serves to explain principles of the invention. However, the scope of the invention is not intended to be limited to the precise details of the embodiments or exact adherence with all system features and/or method steps, since variations will be apparent to a skilled person and are deemed also to be covered by the description. Terms for components used herein should be given a broad interpretation that also encompasses equivalent functions and features.

In some cases, several alternative terms (synonyms) for structural, system features have been provided but such terms are not intended to be exhaustive. For the avoidance of doubt, any terms separated by the "/" symbol generally refer to alternative "or" expressions where the terms can be used interchangeably. Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Any directional terms such as "vertical", "horizontal", "up", "down", "sideways", "upper" and "lower" are used for convenience of explanation usually with reference to the form shown in illustrations and are not intended to be ultimately limiting if an equivalent function can be achieved with an alternative dimension and/or direction. All directional terms are relative to each other.

The description herein refers to embodiments with particular combinations of steps or features, however, it is envisaged that further combinations and cross-combinations of compatible steps or features between embodiments will be possible. Indeed, isolated features may function independently as an invention from other features and not necessarily require implementation as a complete combination.

It will be understood that the illustrated embodiments show applications only for the purposes of explanation. In practice, the invention may be applied to many different configurations, where the embodiment is straightforward for those skilled in the art to implement.

Figures 1, 2:
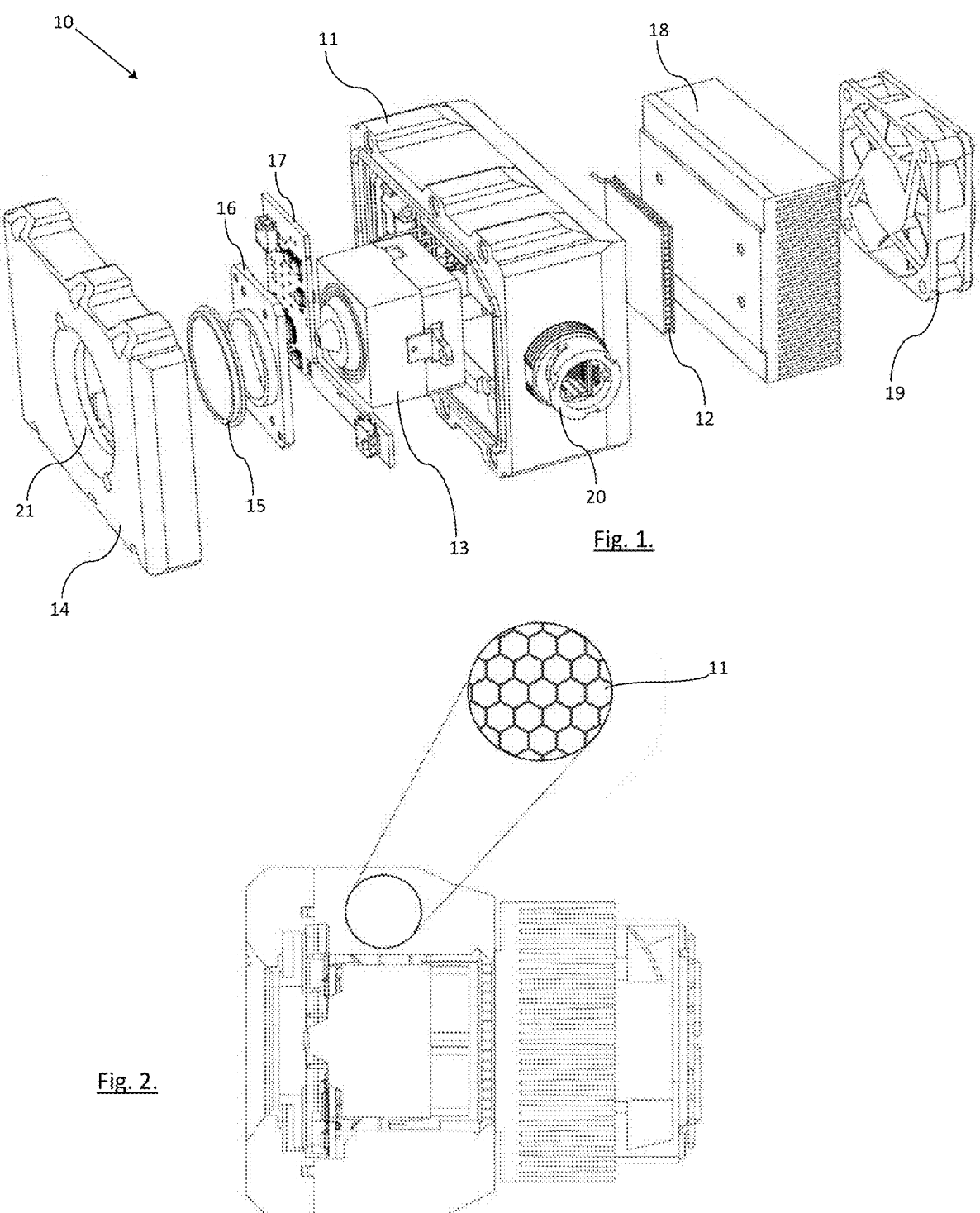
FIG. 1 illustrates an exploded perspective overview of components associated with a camera housing.
FIG. 2 illustrates a cross-section side view, including a zoomed view of a wall structure thereof.

FIG. 1 shows the main components for implementing a system for testing, primarily a camera housing generally denoted 10, including: a temperature isolated enclosure 11, a Peltier module 12 and a camera module 13 embedded in the enclosure 11 for optimal temperature distribution.

Enclosure 11 may be formed as a box housing with a removeable cover 14, such that during assembly the camera module and other components may be accessed from a frontal position. Cover 14 has an opening 21 serving as a window to align with the camera lens.

Also visible in FIG. 1: a window lens 15 (e.g. of glass or other suitable transparent material), a lens heater ring 16, a PCB 17 comprising control electronics, a radiator 18 that is connectable to a rear wall/heat exchanging surface of the housing 11 sandwiching Peltier module 12 therebetween, and a fan unit 19. A port 20 provides side access to housing 11 for the connection of cables to the internal devices. As such the control electronics may be resident within the housing, externally (communicating to components through the port) or a combination thereof.

In the illustrated form, the walls of enclosure 11 are formed with low thermal conductive properties, e.g. as a multi-chambered wall such as shown by FIG. 2. The chambers may form a honeycomb as shown, or other suitable geometric shapes, to exemplify closed air cells. The enclosure 11 may be dimensioned to snugly accommodate the camera module and can be 3D printed for customization to a particular camera module's dimensions. The walls of enclosure 11 are configured to achieve good levels of thermal isolation. In alternative forms the walls may be comprised of a composite structure and/or incorporation of material with extremely low thermal conductivity, such as a synthetic porous layer, e.g. Aerogel®.

The walls allow for better thermal isolation of the camera in a climatic chamber environment and, thus, provides a significant reduction in power dissipation. A lower power requirement enables a smaller Peltier module.

By way of an overview of operation, the camera module may be activated when a temperature within the enclosure is at an optimum operating parameter, enabled by the Peltier module. This may further include activation of the lens heating ring 16 which warms the lens 15 and mitigates fogging. The fan unit 19 may also be activated, particularly for improving thermal transfer from radiator 18 to the surrounding environment (e.g. in a climatic chamber) when it is heated/cooled by Peltier module 12.

By implementing a hermetic structure according to the above, an isolated environment within the housing is created, independent of external conditions, i.e. where a camera and all electronics and optics maintains the same stable working point which leads to identical image quality results. Such considerations especially configure it for use in visual inspection procedures of a monitored product for quality assurance.

Furthermore, use of a Peltier module mitigates interference in the camera under testing conditions, while the multi-chamber thermal insulation of the box walls reduces impact on the environmental conditions inside the test area. A PID (proportional-integral-derivative) regulator may be implemented to achieve desired conditions inside camera, independent of external environment, wherein regulator calibration and diagnostic function may be available on a UART console.

Figure 3:
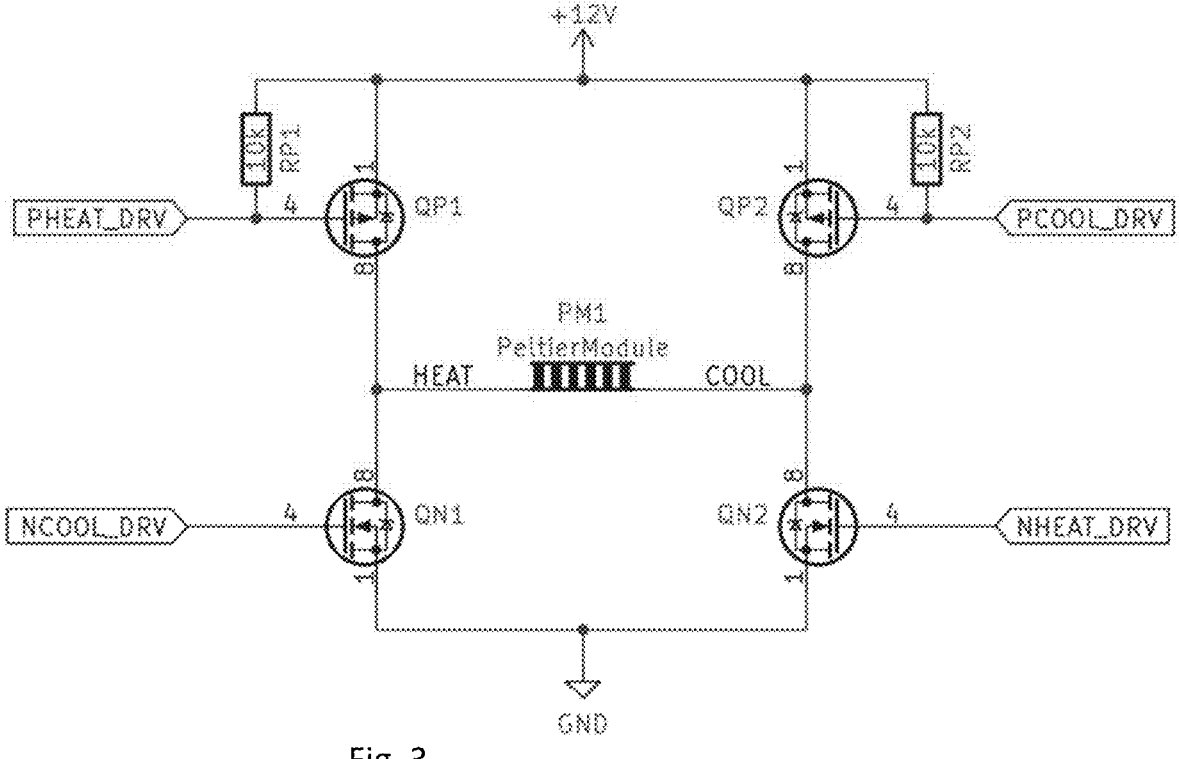
FIG. 3 illustrates a circuit layout for a thermoelectric device.

Referring to FIG. 3 and according to one example, the control circuit may use an H-Bridge to change the direction of current flow through the Peltier module and thus alternately heat or cool the camera module respectively, depending on external conditions.

The temperature inside the camera box may be regulated by a microcontroller (e.g. with an implemented PID regulator) connected to a temperature sensor. A PID algorithm compares two values: a set temperature and an actual Temperature. According to the difference between these two values, a new value of regulation is calculated (to determine heating or cooling). This enables a desired temperature to be achieved independent of external conditions and with negligible fluctuation. The foregoing step response is an example of general PID control to better explain the working principle of the regulator mechanism, which reacts quickly to temperature changes with negligible fluctuation and reaches a stable state to maintain a constant temperature of the camera.

By implementation of a universal asynchronous receiver-transmitter (UART) interface, a user may change settings stored in a non-volatile memory (such as the temperature inside the camera box) to parameters most optimal for the chosen camera. If settings are not modified the temperature adaptation may be configured with default predefined values.

According to the invention, the problem with dimensional expansion of optical elements is eliminated by a constant temperature control described above. However, even while a stable temperature may be maintained within the housing, for ensuring optimal operation of the camera and its electronics, the camera lens and/or window opening in the box may still be subject to condensation due to temperature differential. Accordingly, the problem of lens fogging may be addressed by heating the glass lens with a dedicated ring (e.g. aluminum lens ring 16) with a ceramic heater controlled by the same microcontroller as the Peltier module.

Since electrical power may be used to operate all temperature regulation and lens heating functions, the present solution reduces the mediums that need to be used to only one, i.e. electricity only instead of both electricity and compressed air known from prior art solutions. This outcome simplifies the overall construction and resources needed for the device. Furthermore, the operator using the device for test purposes has more flexibility regarding the placement of the camera inside a climatic chamber. There is also significant noise reduction during operation compared to a compressed air system.

The invention enables a method of testing within a climatic chamber. For example, including the steps of positioning the camera housing so the camera lens has a field of view covering an article to be tested, closing the climatic chamber and setting a target internal temperature thereof, meanwhile a determined operating temperature of the camera is known and an internal space of the housing may be maintained at the determined operating temperature. In embodiments, as the target chamber temperature is known along with the actual current ambient temperature in the chamber, the controller can cause activation of the Peltier module in response/anticipation thereto (i.e. before a target temperature is reached). For example, if the temperature in the chamber is to be very low, the Peltier module can be activated to heat the camera module with immediate effect, i.e. before the external temperature reaches the extreme. Conversely, if the target temperature is to be very high, the Peltier module can be activated to cool the camera module. In this way, monitoring and adjustment of temperature is dynamic and reactive to conditions in the more expedient way to operate the sensor optimally.

By way of summary, a camera system for testing in harsh climatic conditions is described herein. The camera housing includes a cavity for a camera module, a window for alignment with a lens of the camera module, a thermal electric device (e.g. a Peltier module) with a first side configured for thermal communication with the camera module inside the housing and a second side configured for thermal communication outside the housing. There is provision for an external temperature sensor to communicate a signal to a controller corresponding to an external temperature, for activation of the thermal electric device in response thereto. At least the second side of the thermal electric device may be in contact with a radiator or heat sink element for dissipation/absorption of thermal energy generated by the thermal electric device.

By way of further summary, a camera/sensor housing provides an isolated stable temperature environment for a camera/sensor, enabling it to be operated in a range of temperatures. This may be helpful in a testing environment, e.g. for the purposes of detecting defects in products, or other uses. A camera is accommodated in an insulated enclosure and a Peltier module is controlled to provide or remove heat from the enclosure/camera so as to maintain a stable temperature independent of an environmental temperature within a climatic chamber where a product is to be monitored. A lens heater may mitigate fogging of the lens in use.

Several benefits are possible by implementation of the invention, namely:

since image quantization quality is strongly connected with temperature, i.e. true color identification, maintenance of a stable temperature within the housing, in response to a changing external temperature, will preserve image quality;

constant/stable environmental conditions eliminate problems with thermal expansion of optical component which can affect image quality, thus reducing interference;

there is no limitation for type of cameras used, as a housing can be formed (e.g. 3D printed) to accommodate any type of camera;

diagnostic information's plug and play possibilities for image comparison allow detection of issues without impediment;

easily mountable by suitable external surface features on housing;

potential for application with other sensor types, i.e. an isolated environment can be applied to other sensors/modules than an optical sensor such as a camera described herein; for example, where a stable operation point required in a car where a module has to perform a function for critical decisions and temperature could influence results.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A camera housing comprising:
   a camera module;
   an insulated internal volume configured for accommodating the camera module therein; and
   a thermal electric device configured for alternatively heating and cooling at least one of the internal volume or the camera module.

2. The camera housing of claim 1 wherein the thermal electric device includes:
   a first side configured for thermal communication with the internal volume and/or the camera module; and
   a second side configured for thermal communication with a radiator at an outer wall of the camera housing.

3. The camera housing of claim 2 further comprising a fan unit for supplying air onto the radiator.

4. The camera housing of claim 1 further comprising an electric lens heating element at or proximate an opening for aligning with the camera module.

5. The camera housing of claim 1 further comprising a controller configured to control the thermal electric device to regulate temperature within the internal volume.

6. The camera housing of claim 1 further comprising a port for receiving electrical connections therethrough.

7. A system for visually inspecting an article in a range of climatic conditions, the system comprising:
   a camera housing including:
      a camera module,
      an insulated internal volume configured for accommodating a camera module therein, and a thermal electric device configured for alternatively heating and cooling the internal volume and/or the camera module; and
   a controller configured to control the thermal electric device to be energized for maintaining a temperature of the internal volume of an enclosure and/or the camera module corresponding to a recommended operating temperature of the camera module in response to an external temperature outside the enclosure.

8. The system of claim 7 wherein the thermal electric device is a Peltier module with:
   a first side configured for thermal communication with the internal volume of the enclosure and/or the camera module, and
   a second side configured for thermal communication to outside the enclosure.

9. The system of claim 7 further comprising a radiator in thermal communication with the thermal electric device.

10. The system of claim 7 further comprising an electric lens heating element operable by the controller.

11. The system of claim 7 wherein insulated walls of the camera housing include a plurality of closed cells.

12. A method of inspecting an article in a range of climatic conditions, the method comprising:
   positioning a camera housing within a climatic chamber so that a camera module has a field of view covering the article to be tested;
   providing a range of climatic temperatures in the climatic chamber; and
   controlling a thermal electric device to transfer to or remove heat from the camera housing so as to maintain a temperature of the camera module according to a recommended operating temperature independent of an environmental temperature.

13. The method of claim 12 further comprising:
   operating the camera module to capture an image of the article; and
   inspecting the image to determine a presence of one or more defects in the article caused by the climatic temperatures.

14. The method of claim 13 further comprising heating a lens of the camera module to mitigate condensation.

* * * * *